(12) United States Patent
Tierney et al.

(10) Patent No.: US 10,339,647 B2
(45) Date of Patent: Jul. 2, 2019

(54) METHODS, SYSTEMS, AND MEDIA FOR QUALITATIVE AND/OR QUANTITATIVE INDENTATION DETECTION

(71) Applicant: Toyota Motor Engineering & Manufacturing North America, Inc., Erlanger, KY (US)

(72) Inventors: John Tierney, Georgetown, KY (US); Douglas Johanneman, Lexington, KY (US); Thomas Paul King, Georgetown, KY (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 106 days.

(21) Appl. No.: 15/286,987

(22) Filed: Oct. 6, 2016

(65) Prior Publication Data

US 2018/0101946 A1 Apr. 12, 2018

(51) Int. Cl.
*G06T 7/00* (2017.01)
*G06T 7/136* (2017.01)

(52) U.S. Cl.
CPC ............ *G06T 7/0006* (2013.01); *G06T 7/136* (2017.01); *G06T 2207/30108* (2013.01)

(58) Field of Classification Search
CPC ........ G06T 7/0006; G06T 2207/20148; G06T 2207/30252; G06T 2207/30242
See application file for complete search history.

(56) References Cited

U.S. PATENT DOCUMENTS

| | | | | |
|---|---|---|---|---|
| 5,041,726 | A | * 8/1991 | Chang | G01B 9/021 250/341.8 |
| 5,925,436 | A | * 7/1999 | Voss | B05B 12/28 428/121 |
| 6,076,933 | A | 6/2000 | DiLoreo et al. | |
| 6,389,913 | B1 | * 5/2002 | Uegaki | B21D 1/06 73/866.3 |
| 7,968,816 | B2 | 6/2011 | Mikata | |
| 8,322,044 | B2 | * 12/2012 | Gregory | G01B 3/28 33/836 |
| 9,646,345 | B1 | * 5/2017 | Leise | G01B 21/00 |
| 9,759,541 | B2 | * 9/2017 | Ferreira | G01B 21/20 |
| 2008/0105667 | A1 | * 5/2008 | Mikata | B23K 9/02 219/128 |
| 2009/0320310 | A1 | * 12/2009 | Pelotte | G01B 3/28 33/836 |

(Continued)

FOREIGN PATENT DOCUMENTS

JP 2977435 11/1999
JP 2012112694 6/2012

OTHER PUBLICATIONS

Holmberg, Stefan, and Babak Nejabat. "Numerical assessment of stiffness and dent properties of automotive exterior panels." Materials & design 25.5 (2004): 361-368. (Year: 2004).*

*Primary Examiner* — Bobbak Safaipour
(74) *Attorney, Agent, or Firm* — Dinsmore & Shohl LLP

(57) ABSTRACT

Systems and methods for qualitative and/or quantitative indentation detection are provided. A method includes receiving imaging data comprising a plurality of indentations within a region on a surface. The method further includes obtaining a size measurement for each indentation. The method further includes calculating a number of indentations within the region are equal to or above a minimum size.

13 Claims, 5 Drawing Sheets

(56) References Cited

U.S. PATENT DOCUMENTS

| | | | |
|---|---|---|---|
| 2010/0154238 A1* | 6/2010 | Harshbarger | G01B 7/26 33/836 |
| 2010/0326962 A1 | 12/2010 | Calla et al. | |
| 2011/0101735 A1* | 5/2011 | Fujita | B62D 21/152 296/193.06 |
| 2011/0256257 A1* | 10/2011 | Hughes | B23P 15/007 425/547 |
| 2012/0145771 A1* | 6/2012 | Bohlin | B23K 9/1274 228/102 |
| 2012/0297337 A1* | 11/2012 | St. Denis | G08G 1/168 715/810 |
| 2013/0125631 A1* | 5/2013 | Sadahiro | G01N 3/42 73/81 |
| 2015/0013406 A1* | 1/2015 | Arumugam | B21D 1/10 72/17.3 |
| 2017/0106466 A1* | 4/2017 | Sigler | B23K 11/115 |
| 2017/0148102 A1* | 5/2017 | Franke | G06Q 10/20 |
| 2018/0012350 A1* | 1/2018 | Gangitano | H04N 5/23203 |
| 2018/0047177 A1* | 2/2018 | Obropta | G06T 7/55 |
| 2018/0294386 A1* | 10/2018 | Kaneko | C03C 27/06 |

\* cited by examiner

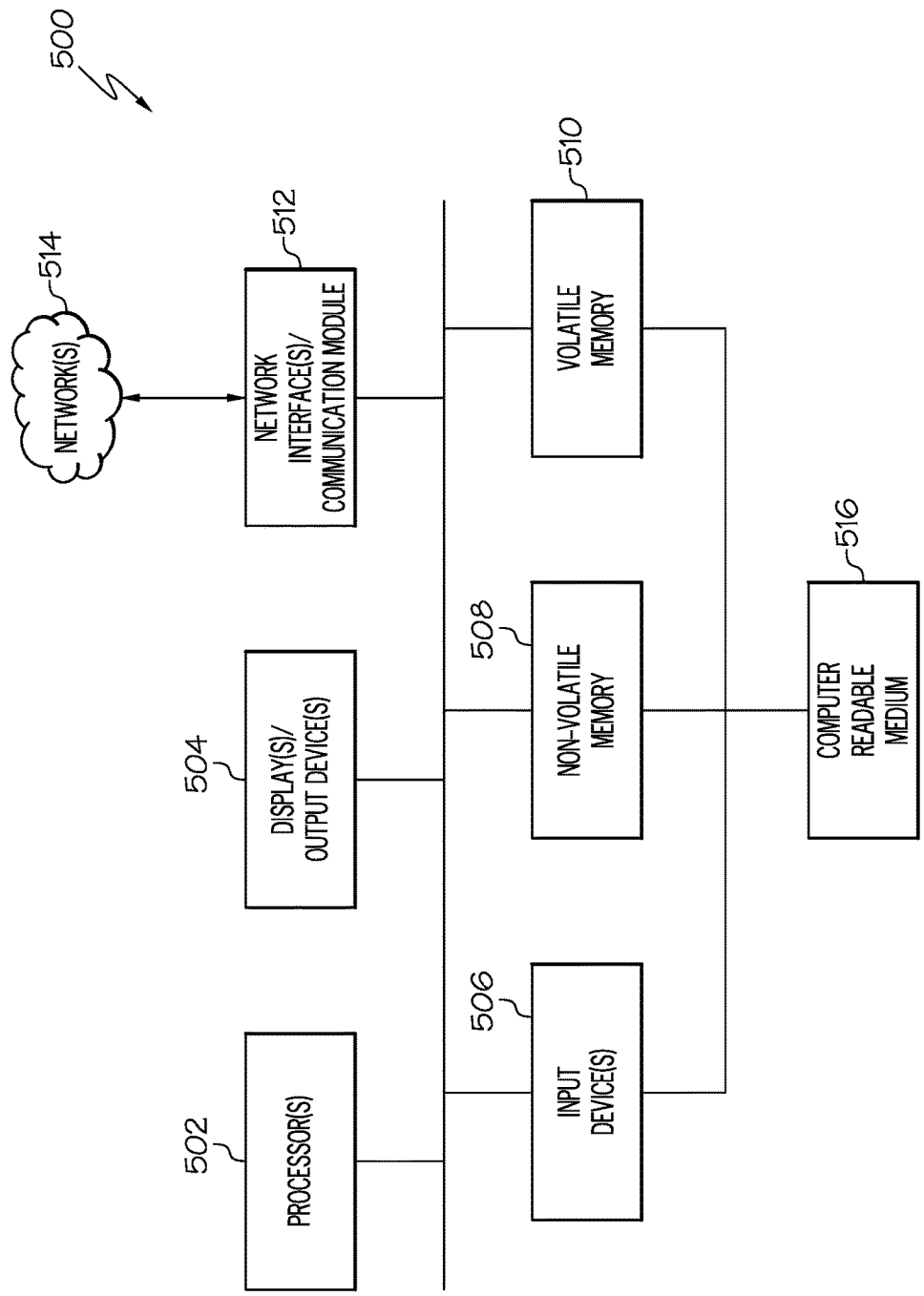

METHODS, SYSTEMS, AND MEDIA FOR QUALITATIVE AND/OR QUANTITATIVE INDENTATION DETECTION

TECHNICAL FIELD

The present disclosure generally relates to object detection and, more particularly, to methods, systems, and media for qualitatively and/or quantitatively detecting indentations of various sizes.

BACKGROUND

In automotive manufacturing, doors can be assembled by combining inner and outer door panels. As part of the manufacturing process, beads may be used (along with adhesive) to form the panels into a joint. How far a given bead penetrates into one or both panels may indicate how well the panels have been joined together. One way to determine the amount of bead penetration within a panel is to measure the size of the indentation. Bead penetration is not always uniform, and in some cases a particular amount of penetration is needed to achieve proper penetration, and therefore cohesion between the panels.

In some cases, beads can become concentrated in one or more areas of the panel, often due to non-uniform distribution. Therefore, a need exist to determine the quality and quantity of bead penetration by determining how many beads have achieved a certain amount of penetration within one or both panels.

SUMMARY

In one embodiment, a method for receiving imaging data includes a plurality of indentations within a region on a surface is disclosed. A size measurement is obtained for each indentation. A number of indentations within the region are equal to or above a minimum size is calculated.

In another embodiment, a system includes a non-transitory memory device, a processor coupled to the memory and a visual analytics component coupled to the processor and the memory. The visual analytics component utilizes the processor and the memory. The system receives, into the memory, imaging data including a plurality of indentations within a region on a surface. Through the processor, a size measurement for each indentation is obtained. A number of indentations within the region that are equal to or above a minimum size is determined.

In yet another embodiment, a method of verifying glass bead indentations within an inner automotive door panel and an outer automotive door panel includes separating the panels joined previously joined together by an adhesive that includes beads. An indented surface from each panel is placed in front of an image capturing device, with each indented surface having been indented by the beads. Imaging data is received from the image capturing device, with the imaging data including multiple indentations within a region on a surface. Multiple indentations in each indented panel surface are identified through an imaging algorithm. A region on each indented panel surface including multiple indentations is determined. A size measurement for each indentation within the region is obtained. Each indentation within the region equal to or above a minimum size is visually indicated. Size data including each indentation on each indented surface is stored.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 5 schematically illustrates a computing system for detecting, analyzing and reporting indentations, according one or more embodiments shown and described herein.

DETAILED DESCRIPTION

Embodiments of the present disclosure are directed to methods, systems, and media for qualitative and/or quantitative indentation detection. Beads are often used within adhesives to form joints, such as hemmed joints, from panels. By separating panels and taking an image of at least one of the panels, the indentations formed from the beads may be analyzed. Using a visual representation of the panel, regions of indentations may be denoted by a superimposed region upon the panel within the visual representation. Specifically, analyzing panel regions with higher bead densities may be preferable and more efficient as compared to analyzing an entire panel. Additionally, indentations meeting size requirements may be highlighted within the visual representation. Tracking bead penetration over time in subsequent panels can then provide for better quality tracking. For example, alerts and/or reports may also be generated based on the placement and quantities of beads of varying sizes (such as size sufficiency versus insufficiency).

Figure 1:
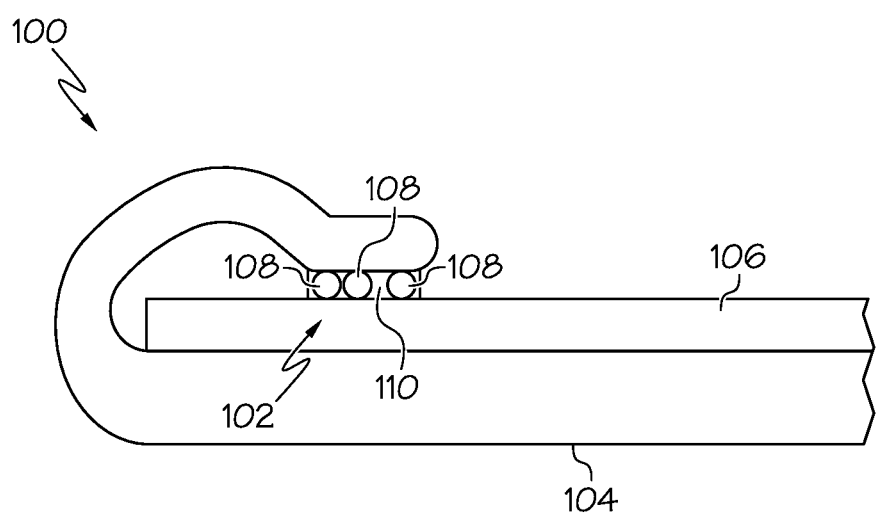
FIG. 1 depicts a diagram schematically illustrating an example hemmed joint formed by inner and outer door panels, according to one or more embodiments described and illustrated herein.

Referring now to FIG. 1, an example automotive door assembly diagram 100 is depicted. A hemmed joint 102 may be formed when an outer panel 104 and an inner panel 106 are joined so that the outer panel 104 wraps around an end of the inner panel 106. The hemmed joint may utilize either an open hem or a closed hem. In other embodiments, a seam may instead be used by joining the edges of the outer panel 104 and the inner panel 106. In the embodiment illustrated in FIG. 1, glass beads 108 of uniform size within an adhesive 110 secure the outer panel 104 to the inner panel 106 within the hemmed joint 102. In other embodiments, any suitable materials for the adhesive 110 and/or the beads 108 may be utilized. In different embodiments, the beads need not have a uniform size. Although automotive doors are discussed as example, any suitable components and/or stand-alone objects may be utilized in the embodiments described herein. Although the beads 108 are described herein as being glass beads, the beads may be fabricated from any other suitable material.

In some embodiments, the panels 104, 106 are forcefully separated after the outer panel 104 is secured to the inner panel 106 by the adhesive 110 and beads 108 (i.e., ripped apart) in a destructive testing process to reveal how deeply each bead 108 penetrated into one or both panels 104, 106. Other embodiments may use x-ray, magnetic resonance imaging, computerized tomography scan, positron emission tomography, or any other suitable type of non-invasive/scanning technique that can measure the size of the indentations created by the beads 102. Having sufficient bead penetration into one or both panels may be used as a quality indicator in terms of joining the panels.

Figure 2:
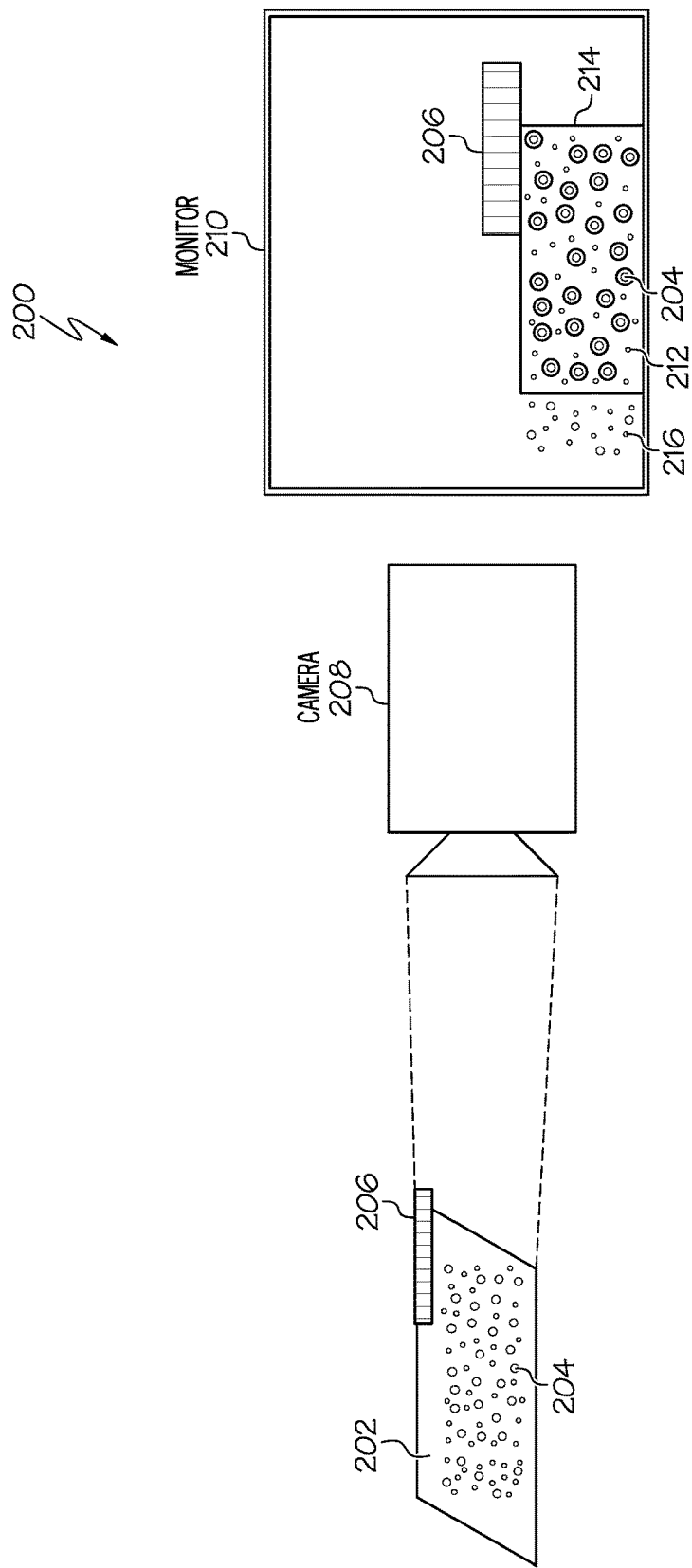
FIG. 2 depicts a diagram schematically illustrating an example computing device analyzing indentations in a panel based upon a visual representation of the panel as captured by a camera, according to one or more embodiments described and illustrated herein.

Turning to FIG. 2, a diagram 200 depicts an embodiment showing an example panel 202 that has been separated from another panel (not shown). In this embodiment, indentations 204 within the panel 202 are the result of at least some of the beads (108 in FIG. 1) having penetrated the panel 202 during the joining process that joins the two panels. Even though the beads in some embodiments have a uniform size, the resulting indentations 204 may be different sizes. An indentation's size may refer to its diameter, radius, circumference, depth, shadow, or any other type of measurement. As will be discussed in more detail below, within the depicted embodiment an indentation size threshold may be utilized. Accordingly, indentations on the panel 202 that meet or exceed a size threshold may be indicated by large circles whereas indentations whose size is below the threshold may be indicated by small circles. In some embodiments, a measuring device 206 (e.g., a ruler or other suitable measuring device) may be optionally utilized to measure indentations and/or provide scale/distance.

A camera 208 may be utilized to capture a visual representation or image (hereinafter used interchangeably) of the panel 202. Any suitable type of image-capture device or camera (still, video, digital, analog, etc.) may be utilized, along with any suitable type of imaging (visible light, night-vision, infra-red, microwave, etc.) to capture the visual representation. Some embodiments can utilize more than one camera to capture multiple angles, stereoscopic images (or other three-dimensional images), etc. One or more lights (not shown), whether external to or part of the camera, can be utilized at any suitable position(s) to illuminate the indentations and/or create shadows.

A monitor 210 may display a visual representation (image, video, etc.) of the panel 202 as captured by the camera 208. In various embodiments, the monitor 210 may be any suitable type of display (computer monitor, television monitor, holographic monitor, 3-dimensional monitor, monochrome, color, projector, etc.) which may be communicatively coupled to or part of any device capable of image processing. The visual representation displayed on the monitor may be live, delayed, and/or stored/historical/archived. In various embodiments, the visual representation of the panel includes the indentations 204 and the measuring device 206.

In one embodiment, indentation 204 displayed on the monitor 210 corresponds to the indentation 204 on the panel. As described above, indentation 204 on the panel 202 is symbolically indicated by a large circle denoting size sufficiency, which is correspondingly depicted as the same indentation 204 on the monitor 210. Image recognition algorithms may be utilized to indentify indentations, such as detection of indentations edges, shadows, reflection, or contrast. Edge detection, shadow detection, object recognition, or any other suitable image processing technique may be utilized to recognize and/or measure indentations. Indentations may be measured according to received scale data with respect to the captured imaging data, according to a visual indicator (such as a rule 206) and/or by scale comparison to other indentions, which may include indentations from previously-analyzed images. In various embodiments, processing may overlay identifiers onto the visual representation displayed on the monitor 210. Here, for example, indentation 204 has a ring overlaid around it due to its size sufficiency, although any type of overlay-indicator may be utilized. In this embodiment, indentations lacking sufficient size 212 are simply displayed without any overlay. In other embodiments, indentations lacking sufficient size 212 may have their own separate indicator(s), or even the same indicator as indentations having sufficient size 204.

One or more areas of the panel 202 having sufficient indentation density may be depicted in the visual representation as being within a region 214, such as in a cluster of indentations. In other embodiments, a region 214 may be based upon the density of only sufficiently-sized indentations 204, rather than the density of all indentions 204, 212. Some external indentations 216 may reside outside of a region 214. In some embodiments, a region 214 may be generated irrespective of the size of external indentations 216. In other embodiments, the size of indentations 204, 212, 216 in the visual representation can be used to determine where the region 214 will be generated (e.g., determining whether preliminarily/potentially external indentations 216 meet size requirements before rendering the region 214).

In some embodiments, determinations such as indentation size, region generation, etc., can be received as parameters. Such parameters can be received from, for example, end-users (such as equipment operators, observers, etc.), administrators (having higher-level privileges than end-users), and/or software/hardware developers, etc. In other embodiments, parameters can be received from other programs/software and/or hardware. Parameters can relate to various types processing discussed below in FIGS. 3 and 4, such as indentation size/range requirements, quantity thresholds (percentages and/or minimum/maximum numbers, or ranges), region determination (whether derived from image recognition, specified values, etc.), quality standards, and/or notifications.

Figure 3:
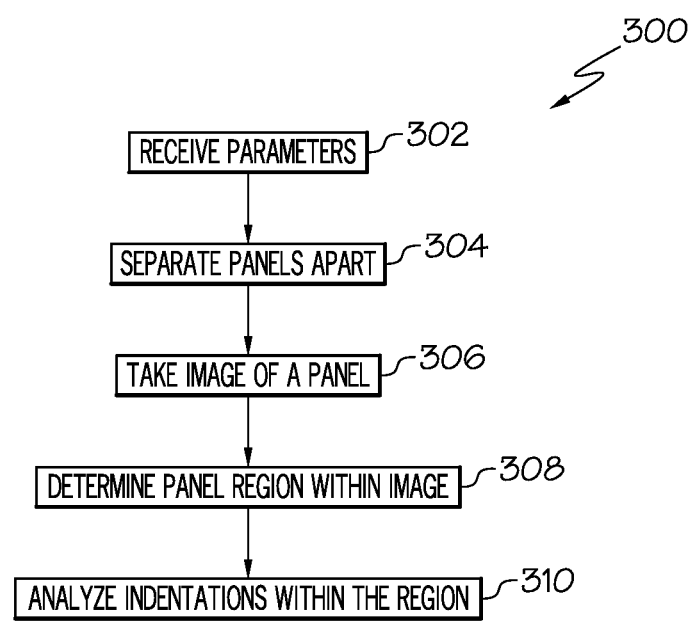
FIG. 3 depicts a flowchart of an example process for detecting indentations, according to one or more embodiments shown and described herein.

Turning to FIG. 3, a flowchart 300 illustrates an example analysis of panels and indentations. In the embodiment depicted at block 302, parameters may be received to establish size thresholds for indentations, such as minimum indentation size, maximum indentation size, a size range, and summation values (e.g., summing size values of indentations within a region). Other parameters may relate to region determination (i.e., 214 in FIG. 2) by defining density thresholds to determine how one or more regions are created and/or modified. Region parameters may specify a minimum, maximum, or range of density regarding all indentions or only those indentions satisfying a size threshold.

Quantity parameters may be based upon a number or percentage of indentations having sufficient size (within a region or on the entire panel). Different embodiments may only receive and/or utilize some parameters, whereas other embodiments do not receive any parameters. In various embodiments, parameters may be received or updated at any time. In some embodiments, parameters may be received and/or updated depending on the user profile-type and/or access rights. Examples of profile types may include administrator, user, guest, developer, tester, etc.

At block 304, panels 104 and 106 are separated. By way of non-limiting example, panels 104 and 106 may be door panels in a vehicle fabrication process. In this embodiment, the panels are separated after receipt of the parameters at block 302. In other embodiments, parameters may be received after the panels have been separated. In this embodiment, the panels are pulled apart in a destructive process. As such, this separation process is only performed on a subset of available panels as part of quality testing. As discussed above, other embodiments may utilize non-invasive scanning to analyze panel indentations 204. In this embodiment, as shown in FIG. 1, once the panels 104 and 106 have been pulled apart, indentations from the beads 108 are visible.

At block 306, once the panels 104 and 106 have been pulled apart, an image or visual representation is captured by a camera 208 in this embodiment. At block 308, a panel region 214 may be determined based upon the captured image of a panel 202. As discussed above, one or more regions may be determined from any suitable criteria, such as indentation density. Here, a region 214 may be determined for an area on a panel 202 having a higher density of indentations based upon an indentation parameter received at 302. Other embodiments may automatically determine a region based upon an area having a higher density of indentations. Still other embodiments determine a panel region based upon a density of indentations satisfying indention size criteria, with or without consideration to the total density of indentions. Various embodiments determine a region based upon the quantity of all indentations or the quantity of only those indentations that meet a size threshold, as specified in one or more parameters received at block 302. Some embodiments may determine a region based upon an area having a quantity of total indentations, or only indentations satisfying one or more size criteria.

At block 310, each indentation within the region may be analyzed. For example, indentations edges, shadows, reflection, and/or contrast may be analyzed to recognize and/or measure indentations. Analysis may be based on edge detection, shadow detection, object recognition, or any other suitable image processing technique. Non-limiting examples of algorithms include scale-invariant feature transform, speeded up robust features, gradient location and orientation histogram, histogram of oriented gradients, blob detection (Laplacian of the Gaussian, Difference of Gaussians, determinant of the Hessian, maximally stable extremal regions, principal curvature-based region detector, etc.), and edge detection.

As discussed above, indentation size may be based upon a variety of measurements. Additionally, indentation shadows may be used to assess indentation size. Once an indentation's size has been determined, the indentation may be highlighted in this embodiment with a circle around it. In other embodiments, various types of indicators can be utilized to indicate indentations having a sufficient size. Some embodiments may utilize varying indicators, such as a highlighting circle or other shape around sufficiently-sized indentations. While this embodiment does not display indicators for indentations of insufficient size or indentations outside of a region, other embodiments do.

Figure 4:
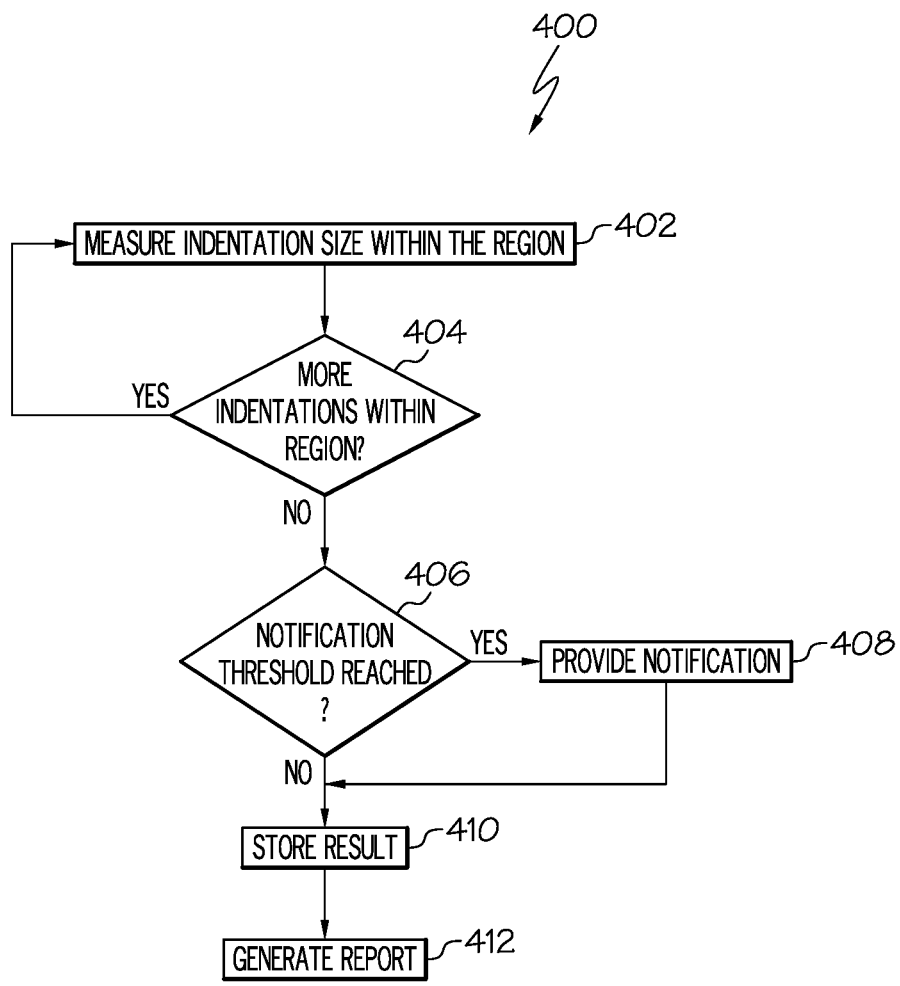
FIG. 4 depicts a flowchart of an example process for analyzing and reporting detected indentations, according to one or more embodiments shown and described herein.

Turning to FIG. 4, a flowchart 400 illustrates indentation tracking and reporting. At block 402, an indentation within a region may be analyzed to determine whether the indentation is of sufficient size (e.g., meets a minimum/maximum size, or is within a size range). In some embodiments, as shown above in FIG. 2, indentations of sufficient size are visually indicated, such as with a circle around such indentations. At block 404, this may be repeated until each indentation within the region has been analyzed.

At block 406, once all indentations in a region have been analyzed, some embodiments utilize one or more quality parameters to establish a quality threshold. Quality parameters may relate to the sizes of indentations within a region, indentation size sufficiency within a region, comparisons of indentation data from the current (or a previous) panel to one or more prior panels, indentation size comparison from the same bead within the two panels that formed a joint, percentage-based quality thresholds, quantitative density-based quality thresholds, quality trend thresholds, etc. Some embodiments generate a summation score from a summation of only individual scores assigned to indentations within the region whose sizes are equal to or above the minimum size, or within a size range. In addition to a summation score, some embodiments may further determine a second summation score comprising a summation of only individual scores assigned to indentations within the region whose sizes are less than the minimum size. Various embodiments store a quantity of summation scores below the threshold summation value as a percentage of all threshold summation scores. Some embodiments determine whether an indentation within the region can be matched to a corresponding indentation in another panel caused by the same bead. Further, the size of the indentation and the size of the penetration of the corresponding indentation can be compared to determine if their sizes are within a threshold amount of each other. Still other embodiments calculate how many indentations within the region are within a size range.

If a notification threshold is not reached, then in some embodiments at block 410 the result is stored. If a notification threshold is reached, then some embodiments provide for a notification at block 408. In various embodiments, a notification can be any suitable type of notification, such as alerts designed to be perceived by the senses (visual, audio, tactile, etc.), electronic notifications (email, text/sms message, printed hardcopy, automated call, social media, etc.), or any type of alert that may be utilized in a custom hardware and/or software environment. For example, quality-control notifications may be generated, such as when a summation score of indentations is below a threshold summation value or range. In another example, continuing with the second summation score discussed above, a notification may be generated if the second summation score exceeds an error threshold summation score. In some embodiments, an error is the amount by which an indentation is outside of a threshold value or range. In such embodiments, summing those error values can produce an error threshold score, which can be used to determine overall quality. Other embodiments generate a notification when, within the region, a threshold quantity or a threshold percentage of indentations are below the minimum size.

At block 410, whether or not a notification has been provided, results of the indentation analysis may be stored. Any suitable data storage may be utilized (database, network, cloud storage, etc.) to store the result. At block 412, one or more reports may be generated that relate to a current panel region, and may include previous panel regions as well. Reports may be produced in electronic or hardcopy, and may include historical data from other panels and/or regions, trends in quality and/or quantity of indentations and/or regions, data relating to parameter values, frequency and/or percentage of panels being analyzed, data regarding equipment utilized for joint formation, materials utilized in panels, adhesives, and/or beads, recommendations, or any other suitable type of analyses derived from stored results. Based on the report, quality and other metrics may be utilized to track and improve quality, costs, and/or efficiency over time.

Turning to FIG. 5, a block diagram illustrates an exemplary computing device 500, through which embodiments of the disclosure can be implemented. The computing device 500 described herein is but one example of a suitable computing device and does not suggest any limitation on the scope of any embodiments presented. Nothing illustrated or described with respect to the computing device 500 should be interpreted as being required or as creating any type of dependency with respect to any element or plurality of elements. In various embodiments, a computing device 500 may include, but need not be limited to, a desktop, laptop, server, client, tablet, smartphone, or any other type of device that can compress data. In an embodiment, the computing device 500 includes at least one processor 502 and memory (non-volatile memory 508 and/or volatile memory 510). In some embodiments, the computing device 500 is a non-transitory computing device, in which the at least one processor is coupled to the memory (non-volatile memory 508 and/or volatile memory 510). A non-transitory computing device 500 may utilize, by way of non-limiting example, RAM, ROM, cache, fiber optics, EPROM/Flash memory, CD/DVD/BD-ROM, hard disk drives, solid-state storage, optical or magnetic storage devices, diskettes, electrical connections having a wire, any system or device that is of a magnetic, optical, semiconductor, or electronic type, or any combination thereof.

The computing device 500 can include one or more displays and/or output devices 504 such as monitors, speakers, headphones, projectors, wearable-displays, holographic displays, and/or printers, for example. The computing device 500 may further include one or more input devices 506 which can include, by way of example, any type of mouse, keyboard, disk/media drive, memory stick/thumb-drive, memory card, pen, touch-input device, biometric scanner, voice/auditory input device, motion-detector, camera, scale, etc.

The computing device 500 typically includes non-volatile memory 508 (ROM, flash memory, etc.), volatile memory 510 (RAM, etc.), or a combination thereof. A network interface 512 can facilitate communications over a network 514 via wires, via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM. Network interface 512 can be communicatively coupled to any device capable of transmitting and/or receiving data via the network 514. Accordingly, the network interface hardware 512 can include a communication transceiver for sending and/or receiving any wired or wireless communication. For example, the network interface hardware 512 may include an antenna, a modem, LAN port, Wi-Fi card, WiMax card, mobile communications hardware, near-field communication hardware, satellite communication hardware and/or any wired or wireless hardware for communicating with other networks and/or devices.

A computer-readable medium 516 may comprise a plurality of computer readable mediums, each of which may be either a computer readable storage medium or a computer readable signal medium. A computer readable storage medium 516 may reside, for example, within an input device 506, non-volatile memory 508, volatile memory 510, or any combination thereof. A computer readable storage medium can include tangible media that is able to store instructions associated with, or used by, a device or system. A computer readable storage medium includes, by way of non-limiting examples: RAM, ROM, cache, fiber optics, EPROM/Flash memory, CD/DVD/BD-ROM, hard disk drives, solid-state storage, optical or magnetic storage devices, diskettes, electrical connections having a wire, or any combination thereof. A computer readable storage medium may also include, for example, a system or device that is of a magnetic, optical, semiconductor, or electronic type. Computer readable storage media and computer readable signal media are mutually exclusive.

A computer readable signal medium can include any type of computer readable medium that is not a computer readable storage medium and may include, for example, propagated signals taking any number of forms such as optical, electromagnetic, or a combination thereof. A computer readable signal medium may include propagated data signals containing computer readable code, for example, within a carrier wave. Computer readable storage media and computer readable signal media are mutually exclusive.

The computing device 500 may include one or more network interfaces 512 to facilitate communication with one or more remote devices 518, which may include, for example, client and/or server devices. A network interface 512 may also be described as a communications module, as these terms may be used interchangeably.

It should now be understood that embodiments described herein are directed to detection of indentations formed by beads during a joint-formation process during the assembly of door panels. The doors may have to be physically separated to be able to view the indentions caused by the beads. A camera may be used to capture images of the panel so that panel indentations can be grouped into a region and analyzed for their size sufficiency. This type of qualitative and/or quantitative analysis of the indentations may then provide for quality alerts and/or generation of reports that can lead to improvements based on the analysis.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

It is noted that the terms "substantially" and "about" and "approximately" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A method of verifying glass bead indentations within an inner automotive door panel and an outer automotive door panel, the method comprising:
   separating the panels previously joined together by an adhesive comprising beads;
   placing an indented surface from each panel, each indented surface having been indented by the beads, in front of an image capturing device;
   receiving imaging data from the image capturing device, the imaging data comprising a plurality of indentations within a region on a surface of the inner automotive door panel or the outer automotive door panel;
   identifying, through an imaging algorithm, a plurality of indentations in each indented panel surface;
   obtaining a size measurement for each indentation of the identified plurality of indentations in each indented panel surface; and
   calculating a number of indentations within the region that are equal to or above a minimum size.

2. The method of claim 1, further comprising generating output when, within the region, a threshold quantity or a threshold percentage of indentations that are below the minimum size.

3. The method of claim 1, further comprising generating a summation score comprising a summation of only individual scores assigned to indentations within the region whose sizes are equal to or above the minimum size.

4. The method of claim 3, further comprising receiving input values for the minimum size and a threshold summation value.

5. The method of claim 3, further comprising generating output based upon the summation score being below a threshold summation value.

6. The method of claim 5, further comprising storing a quantity of summation scores below the threshold summation value as a percentage of all threshold summation scores.

7. The method of claim 1, further comprising receiving as input the minimum size or a size range.

8. A method of verifying glass bead indentations within an inner automotive door panel and an outer automotive door panel, the method comprising:
   separating the panels joined previously joined together by an adhesive comprising beads;
   placing an indented surface from each panel, each indented surface having been indented by the beads, in front of an image capturing device;
   receiving imaging data from the image capturing device, the imaging data comprising a plurality of indentations within a region on a surface of the inner automotive door panel or the outer automotive door panel;
   identifying, through an imaging algorithm, a plurality of indentations in each indented panel surface;
   determining a region on each indented panel surface comprising the plurality of indentations or a subset of the plurality of indentations;
   obtaining a size measurement for each indentation within the region;
   visually indicating each indentation within the region equal to or above a minimum size; and
   storing size data comprising each indentation on each indented surface.

9. The method of claim 8, further comprising generating output when, within the region, a threshold quantity or a threshold percentage of indentations that is below the minimum size.

10. The method of claim 8, further comprising receiving input values for the minimum size and a threshold summation value.

11. The method of claim 8, further comprising generating output based upon a summation score being below a threshold summation value.

12. The method of claim 8, further comprising:
   generating a summation score comprising a summation of only individual scores assigned to indentations within the region whose sizes are equal to or above the minimum size; and
   generating a second summation score comprising a summation of only individual scores assigned to indentations within the region whose sizes are less than the minimum size.

13. The method of claim 12, further comprising generating output based upon the second summation score exceeding an error threshold summation score.

* * * * *